US005893906A

United States Patent [19]
Daffin et al.

[11] Patent Number: 5,893,906
[45] Date of Patent: *Apr. 13, 1999

[54] MANAGING WORK IN A COMPUTING APPLICATION

[75] Inventors: Terrance A. Daffin, Sacramento; Brett L. Barton, Folsom, both of Calif.

[73] Assignee: Electronic Data Systems Corporation, Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/696,307

[22] Filed: Aug. 13, 1996

[51] Int. Cl.⁶ ............................................. G06F 17/60
[52] U.S. Cl. ........................ 705/28; 705/9; 364/468.06
[58] Field of Search .............................. 705/28, 29, 7, 705/8, 9; 364/468.06

[56] References Cited

U.S. PATENT DOCUMENTS

| | | | |
|---|---|---|---|
| 4,459,663 | 7/1984 | Dye | 705/29 |
| 4,802,094 | 1/1989 | Nakamura et al. | 364/468.22 |
| 4,974,166 | 11/1990 | Maney et al. | 364/468.2 |
| 5,182,705 | 1/1993 | Barr et al. | 705/11 |
| 5,191,534 | 3/1993 | Orr et al. | 705/29 X |
| 5,231,585 | 7/1993 | Kobayashi et al. | 364/468.22 X |
| 5,301,320 | 4/1994 | McAtee et al. | 705/9 |
| 5,319,544 | 6/1994 | Schmerer et al. | 705/28 |
| 5,402,336 | 3/1995 | Spiegelhoff et al. | 705/8 |
| 5,463,555 | 10/1995 | Ward et al. | 364/468 |
| 5,530,861 | 6/1996 | Diamant et al. | 705/8 |
| 5,557,515 | 9/1996 | Abbruzzese et al. | 705/9 |

OTHER PUBLICATIONS

"RWT's OnTrack Cuts Lead Times, Automates Paperwork, Reports Product Quality Data for Major Aerospace Manufactuer." News Release (from Dialog, IAC Promt 06018138). Feb. 1996.

"Digital Systems Announces CMMS Product Support." News Release (from Dialog, IAC Promt 060106161). Feb. 1996.

Klement, Uri. "A Global Network for Plant Design." Mechnical Engineering, v. 118, No. 12, pp. 52–54. Dec. 1996.

"Lawson Adds Work Order Module to Supply Chain Suite." Business Wire, p. 06111024. Jun. 1997.

Primary Examiner—Allen R. MacDonald
Assistant Examiner—Michele Stuckey Crecca
Attorney, Agent, or Firm—Ann C. Livingston; L. Joy Griebenow

[57] ABSTRACT

An automated system (30) is provided for managing work in a computing application. The system (30) includes an interface (32, 38) which can receive inventory information (11) for the computing application. The interface (32, 38) also may receive a work order configuration. A memory (36), which is coupled to the interface (32, 38), stores the inventory information (11). A processor (40) is coupled to the memory (36) and the interface (32, 38). The processor (40) automatically generates a work order (28) in response to the work order configuration, such work order (28) specifying at least a portion of the inventory information (11). The processor (40) tracks the work order (28) as actions are taken pursuant to the work order (28), thereby managing work in the computing application.

20 Claims, 6 Drawing Sheets

MANAGING WORK IN A COMPUTING APPLICATION

BACKGROUND OF THE INVENTION

In the modern world, many functions can be automated in a computing application. Typically, as the application is being developed, structured, maintained, or upgraded, a project leader will assign different tasks or work orders to various system engineers, each work order relating to a portion of the computing application, such as a specific program. The number of work orders and systems engineers associated with a computing application is directly proportional to the size of the application. For large computing applications, it becomes extremely difficult for a project leader to manage the necessary staff of engineers and work orders. For example, one engineer may be overburdened with multiple work orders while another engineer does not have any work orders. Also, a system engineer may be unable to accept a work order because of vacation or sickness. Furthermore, different work orders may have different deadlines. Thus, a project leader must remember, among other things, what work orders need to be performed, which engineers are working on the work orders, which engineers are unavailable or overburdened, which work orders have which deadlines, and which work orders have been completed. Accordingly, a need has arisen for a system and method for managing work in a computing application.

SUMMARY OF THE INVENTION

In accordance with the present invention, the disadvantages and problems associated with managing work in a computing application have been substantially reduced or eliminated.

In accordance with one embodiment of the present invention, an automated system is provided for managing work in a computing application. The system includes an interface which can receive inventory information for the computing application. The interface may also receive a work order configuration. A memory, which is coupled to the interface, stores the inventory information. A processor is coupled to the memory and the interface. The processor automatically generates a work order in response to the work order configuration, such work order specifying at least a portion of the inventory information. The processor tracks the work order as actions are taken pursuant to the work order, thereby managing work in the computing application.

In accordance with another embodiment of the present invention, an automated method is provided for managing work in a computing application. The method includes receiving inventory information and a work order configuration. A work order is generated in response to the work order configuration, such work order specifying at least a portion of the inventory information. The work order is tracked as actions are taken pursuant to the work order, thereby managing work in the computing application.

Important technical advantages of the present invention include maintaining a data structure which defines a computing application. The data structure preferably includes information relating to a program in the computing application and the program's associated subsystems, copybooks, tag names, maps, reports, files, and sorts. Elements in this data structure can be used to drive the generation of, and may be included in, one or more work orders for the programs. Consequently, the work orders contain detailed information to assist various users in either assigning or performing work for the computing application.

Another technical advantage of the present invention includes providing a system and method performed on a computer which automatically track a work order from generation until completion. A project leader is able to generate a work order using the above-mentioned data structure, after which the work order is assigned to a systems engineer. If the systems engineer is unable to work on the work order, the engineer can reject the assignment. The project leader may then reassign the work order to another system engineer. After the assigned engineer finishes working on the work order, the project leader can assign the work order to a quality assurance engineer, which, like the system engineer, can accept or reject the work order. The quality assurance engineer who accepts the work order ensures the system engineer has completely and correctly performed the work. If not, the quality assurance engineer notifies the project leader, who reassigns the work order back to the system engineer for additional work. These steps are repeated until all work pursuant to the work order has been completely and correctly performed. During all of these steps, the system and method of the present invention automatically notify the appropriate person or persons to take action on the work order. In addition, the system and method automatically track which person or persons are performing work or need to perform work pursuant to the work order. Consequently, a project leader is able to manage the staff of engineers and the work orders.

Yet another important technical advantage of the present invention includes automatically generating a checklist corresponding to a work order to ensure that all work pursuant to the work order has been completely and correctly performed. The checklist can be used by both a system engineer and a quality assurance engineer performing work on, or inspecting work performed pursuant to, a work order. The checklist is preferably work order specific so that it includes sufficient detail to assist the system engineer or the quality assurance engineer in reviewing work.

Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–7 of the drawings, like numerals used for like and corresponding parts of the various drawings.

Figure 1:
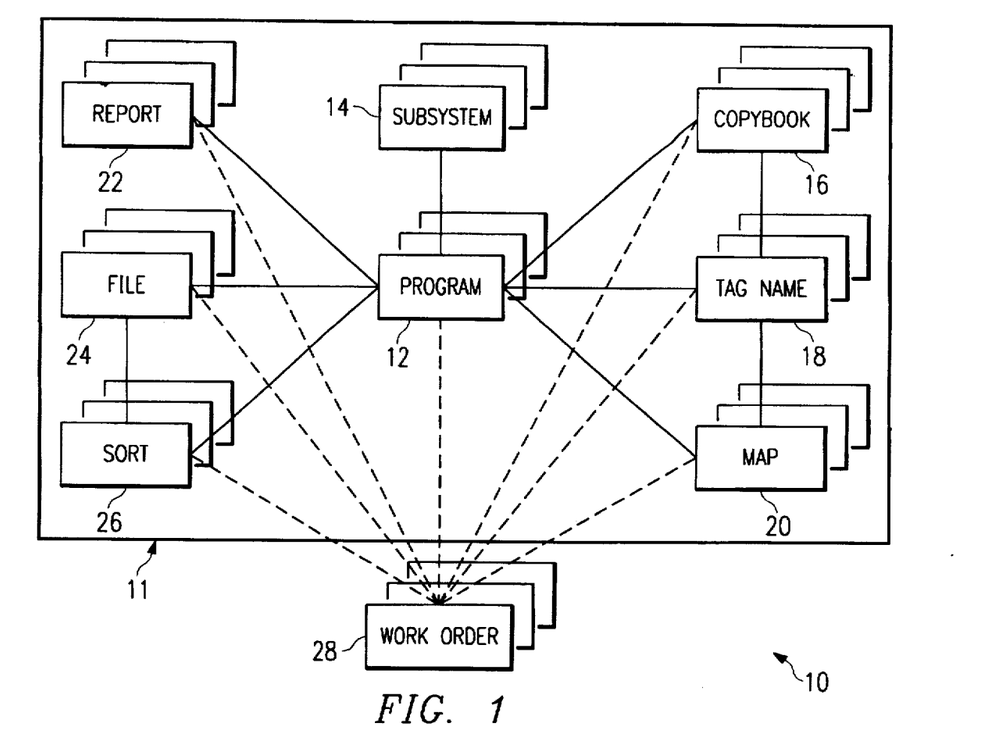
FIG. 1 illustrates a data structure for managing work in a computing application.

FIG. 1 illustrates a data structure 10 which defines a computing application by associating various elements of the computing application. Data structure 10 can be developed and maintained in conjunction with the associated computing application, or, alternatively, data structure 10 can be created after the application has been implemented. In any case, data structure 10 can be used throughout the life of the computing application to manage work related to the application, as described below. Data structure 10 specifies an "inventory" for the computing application that includes various kinds of inventory information 11 including, for example, information relating to one or more programs 12, subsystems 14, copybooks 16, tag names 18, maps 20, reports 22, files 24, and sorts 26. Within data structure 10, this inventory information 11 is linked or related, for example, by various indices or pointers.

As shown in FIG. 1, all inventory information 11 in data structure 10 can be related by programs 12. Programs 12, individually and in combination, drive the computing application. Each program 12 performs one or more functions in the computing application, such as the receipt, process, manipulation, generation, or transfer of data. Each subsystem 14 may comprise a grouping of related programs 12. The same program 12 can be contained within multiple subsystems 14.

Each copybook 16 preferably constitutes a grouping of variable names for data elements that are used by one or more programs 12. In other words, copybooks 16 allow different programs 12 to share the same variables. Typically, the same variable names are contained in a particular copybook 16 throughout the life of a computing application. Thus, the information in copybooks 16 can be static in that the information does not change over time. Each copybook 16 may be associated with more than one program 12. Also, multiple copybooks 16 can be associated with a single program 12.

One or more tag names 18 may be contained within each copybook 16. Tag names 18 specify the actual variable names used by programs 12. A particular tag name 18 may appear in multiple copybooks 16 and programs 12. Like copybooks 16, tag names 18 can be static information.

Each map 20 may comprise information which can be used by one or more programs 12 to generate display screens. Blanks or gaps in screens generated from each map 20 may be filled with data elements represented by tag names 12 and copybooks 16. A particular map may be associated with multiple programs 12, tag names 18, and copybooks 16. Maps 20 contain both literal screen information and variable screen information that is received and sent by a program 12. The variable screen information depends upon the data elements specified by the tag names 18 and copybooks 16 associated with the maps 20.

One or more reports 22 may be generated by each program 12 in response to the receipt, generation, processing, manipulation, or transmission of data. Each report 22 is results-driven and is output by a particular program 12. Multiple reports 22 can be output by the same program 12. Reports 22 can contain dynamic information which changes with the results of the programs 12.

One or more files 24 may be associated or used by programs 12. Each file 24 comprises one or more data elements which are received, manipulated, processed, or generated by programs 12. Files 24 may contain the data elements specified by the variables contained in copybooks 16 and tag names 18. These data elements in files 24 can be used to fill in blanks in the screens generated from maps 20. Each data element of a file 24 may comprise a structured order of data bytes wherein certain bytes are related to specific items.

One or more sorts 26 function to "rearrange" the data structure of the data elements in files 24. For example, a data element may comprise thirty-two bytes of information, the first five bytes representing a name and the second five bytes representing a case number. A sort 26 functions to reorder the data element if a particular program 12 requires that the bytes representing the name be ordered before the bytes for the case number. Each sort 26 may be associated with one or more files 24 and one or more programs 12.

Generally, work orders 28 specify one or more programs 12 upon which testing, development, analysis, maintenance, updating, or any other suitable type of work should be performed. Each work order 28 is a description of a work assignment based upon one or more elements of inventory information 11. When a work order 28 is generated, as described below in more detail, the work order is associated with the programs 12, subsystems 14, copybooks 16, tag names 18, maps 20, reports 22, files 24, and sorts 26 upon which work is to be performed. Consequently, any person which performs or manages work related to the work order 28, such as a project leader, a system engineer, or quality assurance engineer, is able to obtain detailed information about the nature of the work order 28. In one embodiment, work orders 28 may be categorized into four types: analysis, construction, testing, and shipping. Analysis work orders define the scope of changes to be made in a computing application. Construction work orders implement the changes. Testing work orders test the operation of the computing application after changes have been made. Shipping work orders prepare the computing application for production or delivery to a customer after it has been tested.

Figure 2:
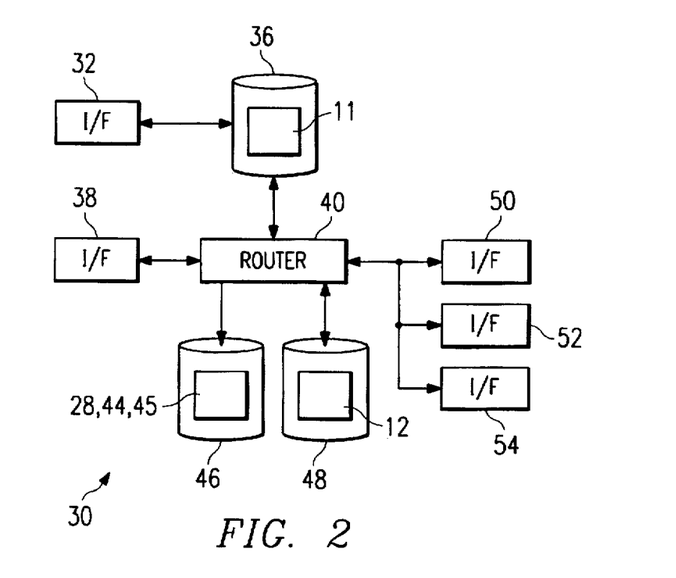
FIG. 2 illustrates an automated system for managing work in a computing application, according to an embodiment of the present invention.

FIG. 2 illustrates an automated system 30 for managing work in a computing application, preferably with respect to work orders 28. System 30 may function to generate, modify, and maintain data structure 10 shown in FIG. 1. System 30 includes a first interface 32 for inputting and retrieving information. The functionality of first interface 32 can be performed by one or more suitable input devices, such as a key pad, touch screen, input port, or other suitable device that can accept information, and one or more suitable output devices, such as a computer display or output port, for conveying information associated with the operation of system 30, including digital data, visual information, or audio information. Inventory information 11 specified in data structure 10 may be automatically input into system 30 using suitable software and/or hardware. The software can include one or more analysis tools which interrogate each program 12 to identify associated subsystems 14, copybooks 16, tag names 18, maps 20, reports 22, files 24, and sorts 26. Afterwards, inventory information 11 identified by the software can be automatically entered into system 30 via interface 32.

An inventory memory 36 may be coupled to first interface 32. Inventory memory 36 may reside in a suitable storage medium, such as random access memory (RAM), read-only memory (ROM), disk, tape storage, or other suitable volatile or non-volatile data storage system. Inventory memory 36, which may be a relational database, receives, stores, and forwards inventory information 11.

A second interface 38 functions to allow a project leader for the computing application to interact with system 30.

Like first interface 32, the functionality of second interface 38 may be performed by one or more suitable input devices, such as a key pad, touch screen, input port, or other suitable device that can accept information, and one or more suitable output devices, such as a computer display or output port, for conveying information associated with the operation of system 30, including digital data, visual information, or audio information. In one embodiment, second interface 38 may be the same interface as first interface 32. A project leader may configure, assign, reassign, monitor, track, or otherwise manage one or more work orders 28 via second interface 38.

A router 40 is coupled to inventory memory 36 and second interface 38. The functionality of router 40 may be performed by a processor, such as a main-frame, file server, work station, or other suitable data processing facility running appropriate software. Router 40 functions to generate one or more work orders 28 and checklists 44 in response to instructions received from a project leader via interface 38 and the inventory information 11 stored in inventory memory 36. Each work order 28 specifies work to be performed on one or more programs 12 identified in inventory information 11. Because of the associations in data structure 10, the subsystems 14, copybooks 16, tag names 18, maps 20, reports 22, files 24, and sorts 26 related to the program 12 can also be specified in work order 28. Each checklist 44 may be associated with a particular program 12 in a particular work order 28 and may comprise a number of items that should be checked when work is performed on the program 12 pursuant to the work order 28. In one embodiment, a separate checklist 44 is automatically generated for each program 12 specified in a work order 28 when a project leader configures the work order 28 using second interface 38 and router 40. An exemplary work order 28 and an exemplary checklist 44 are illustrated and explained below in more detail with reference to FIGS. 4 and 6, respectively.

Router 40 also functions to route the work orders 28 and checklists 44 to appropriate system engineers and quality assurance engineers, as described below in more detail. Router 40 may also function to retrieve specific programs 12 of the computing application in response to the generated work orders 28. These programs are then down-loaded to the system engineer who accepts the work order 28. Consequently, the engineer is not required to access and down-load the program, thereby increasing efficiency.

Router 40 is also operable to generate a work history 45 for each work order 28. Each work history 45 may specify details regarding the status of an associated work order 28, including action to be taken, work in progress, assigned engineers, dates for assignment and completion, and any other suitable details. The information contained in work histories 45 allow the users of system 30 to track each work order 28 to determine status, assignment, work-in-progress, date started, date completed, or any other suitable detailed information regarding the work order 28.

A work order memory 46 and a program memory 48 may be coupled to router 40. These memories may reside in a suitable storage medium, such as RAM, ROM, disk, tape storage, or other suitable volatile or non-volatile data storage system, which can be the same or separate from the data storage system containing inventory memory 36. Work order memory 46 and program memory 48 each can be a relational database. Work order memory 46 stores information received from, processed by, or generated by router 40, including work orders 28, checklists 44, and work histories 45. Program memory 48 functions to store programs 12 for the computing application.

A plurality of additional interfaces 50-54 are also coupled to router 40. Like first interface 32 and second interface 38, the functionality of each of interfaces 50-54 may be performed by one or more suitable input devices, such as a key pad, touch screen, input port, or other suitable device that can accept information, and one or more suitable output devices, such as a computer display or output port, for conveying information associated with the operation of system 30, including digital data, visual information, or audio information. In other embodiments, each or all of these additional interfaces 50-54 may be the same interface as first interface 32 and/or second interface 38. Thus, the present invention contemplates that the same interface can receive or output information to multiple users or pieces of equipment. Such users may include, but are not limited to, project leaders, system engineers, and quality assurance engineers.

Interfaces 50-54 preferably allow system engineers and quality assurance engineers to receive, input, or respond to information in system 30, including work orders 28, checklists 44, work histories 45, and programs 12. Using any of interfaces 50-54, a system engineer or a quality assurance engineer may communicate with system 30 to view a work order 28, accept or refuse a work order 28, complete a checklist 44, view a status or a work history 45, or any other suitable interaction with system 30.

In operation, inventory information 11 is received at first interface 32 and stored in inventory memory 36. A project leader may then use a suitable interface, such as, for example, second interface 38, to configure a work order 28 for a program 12 identified in the inventory information 11. Router 40 generates the work order 28 and a corresponding checklist 44, which both can be stored in work order memory 46. Using second interface 38, a project leader may then direct or assign the work order 28 to a suitable system engineer. System 30 notifies the system engineer, for example, by displaying the work order 28 at one of interfaces 50-54. If the system engineer accepts the work order 28, router 40 retrieves the program 12 on which work is to be performed from program memory 48 and down-loads the program 12 for work at a memory coupled to the appropriate interface 50-54. The checklist 44 corresponding to the work order 28 is also transmitted and displayed to the system engineer at the appropriate interface. If the system engineer rejects the work order 28, system 30 notifies the project leader via second interface 38. The project leader may then re-assign the work order 28 to the same system engineer or re-direct the work order 28 to another system engineer in the manner described above. After the system engineer completes work on the program 12 pursuant to the work order 28, the system engineer will complete the corresponding work order checklist 44 at one of interfaces 50-54. System 30 then notifies the project leader via second interface 38 that the work order has been completed. Using second interface 38, the project leader may then assign or direct the work order 28 to a quality assurance engineer. System 30 notifies the quality assurance engineer at the appropriate interface 50-54. The quality assurance engineer may accept or reject the work order 28 in the same manner as described above. The corresponding work order checklist 44 is also transmitted and displayed to the quality assurance engineer. The quality assurance engineer checks the work performed by the system engineer pursuant to the work order 28 and then completes the checklist 44. If the work performed by the system engineer is incorrect or incomplete, system 30 notifies the project leader via interface 38 that work must still be performed pursuant to the work order 28. At this point, the project leader may re-assign or re-direct the work order 28 to the same or a different system engineer for additional work. When all work is complete, system 30 closes the work order 28. During the processing of the work order 28 described above, system 30 generates and updates a work history 45 for the work order. Consequently, at any point during the processing, a project leader, system engineer, quality assurance, or any other appropriate user can monitor or track the work order 28.

Figure 3:
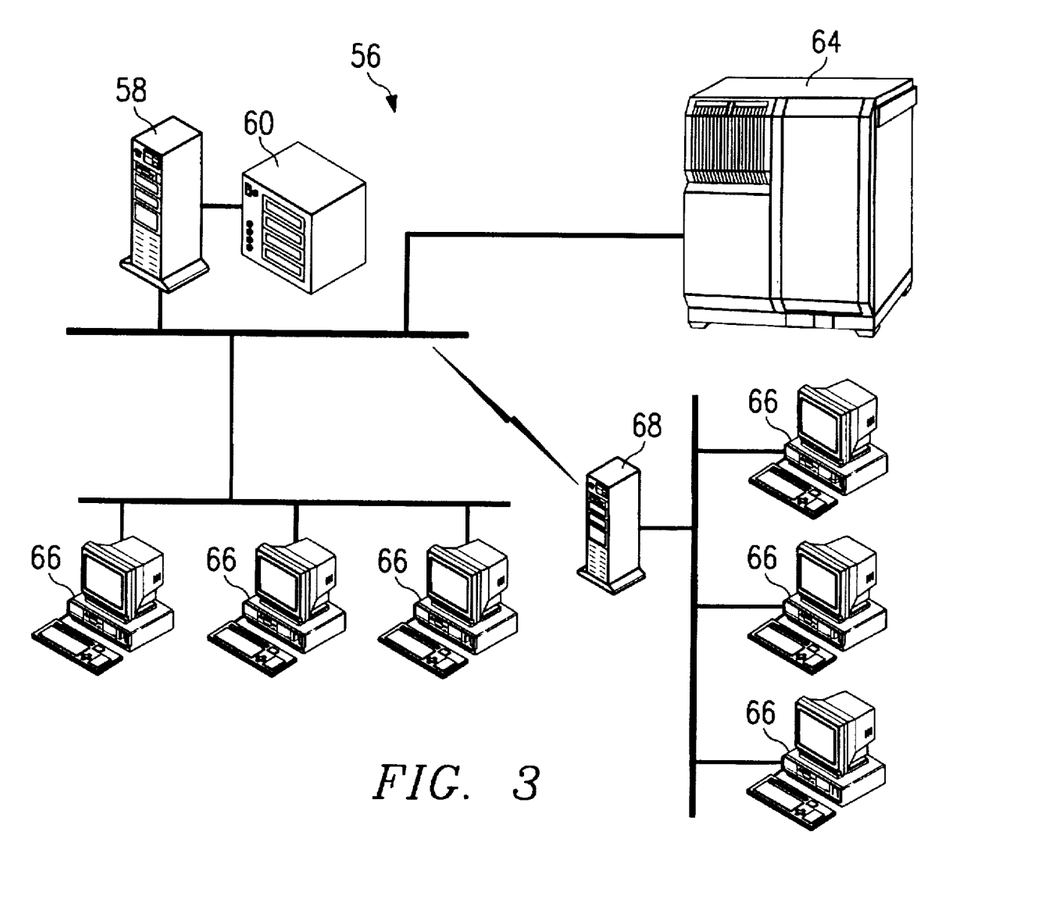
FIG. 3 illustrates an exemplary computer-based system that can be used to implement the managing system shown in FIG. 2.

FIG. 3 is a simplified diagram of an exemplary computer-based system 56 that can be used to implement the managing system 30 shown in FIG. 2. Referring to the embodiment shown in FIG. 3, computer-based system 56 can include a process server 58, a data storage device 60, a computer 64, a plurality of work stations or desk top computers 66, and a local file server 68.

Process server 58 preferably functions to process inventory information 11, work orders 28, work order checklists 44, work histories 45, and programs 12 received or generated by system 30. A SUN SOLARIS 2.3 system has been successfully utilized as a process server 58. Data storage device 60 can be a mass storage subsystem of tapes or disk drives, which is electronically coupled to process server 58. In one embodiment, a relational database resides in data storage device 60. Inventory memory 36, work order memory 46, and program memory 48 shown in FIG. 2, can be stored in the relational database residing in data storage device 60. Process server 58 may retrieve, process, and store the information in the relational database residing in data storage device 60.

Computer 64 may be linked electronically to process server 58 through a local area network (LAN) or wide area network (WAN), for automated up-loading and down-loading of information therebetween. Any computer, which includes a central processing unit (CPU) and suitable RAM, ROM, and input/output (I/O) circuitry can be utilized for computer 64.

At least one work station 66 can be coupled to process server 58 by the same or a different LAN or WAN connecting computer 64. Preferably, each work station 66 is a desk top computer having at least a "486" processor or an operational equivalent. Work stations 66 may function to receive and display inventory information 11, work orders 28, checklists 44, work histories 45, and programs 12 to any user of system 30, including, but not limited to, a project leader, a system engineer, or a quality assurance engineer. In addition, a work station 66, running appropriate software, may be coupled to the hardware components of a computing application so that inventory information 11 can be automatically received or generated by system 30.

Local file server 68 may be linked electronically to process server 58 by the same or a different LAN or WAN, or by telecommunications line through a modem (not specifically shown). Additionally, as shown for illustrative purposes only in FIG. 3, process server 58 can be linked by a "gateway" interface communications processor to local file server 68. Local file server 68 is preferably connected to at least a second work station 66, which provides the same functionality as the first work station 66 previously described. Consequently, computer-based system 56 may provide a distributed network that allows interaction at multiple locations.

A project leader, system engineer, or quality assurance engineer can use computer-based system 56 to collect, maintain, generate, or process inventor information 11, work orders 28, checklists 44, and work histories 45. Because a computing application can be implemented globally, information associated with the computing application can be collected at a number of different sites via a suitable work station 66, main frame 64, local process server 58, or local file server 68. This information can then be relayed to a centralized location, such as process server 58, data storage device 60, or computer 64, for storage and analysis. Process server 58, computer 64, work stations 66, and local file server 68, either individually or in combination, can perform the functionality of router 40. Furthermore, because these devices are preferably linked together, each can directly access (e.g., store and retrieve) the inventory information 11, work orders 28, checklists 44, work histories 45, and programs 12, if necessary.

Figure 4:
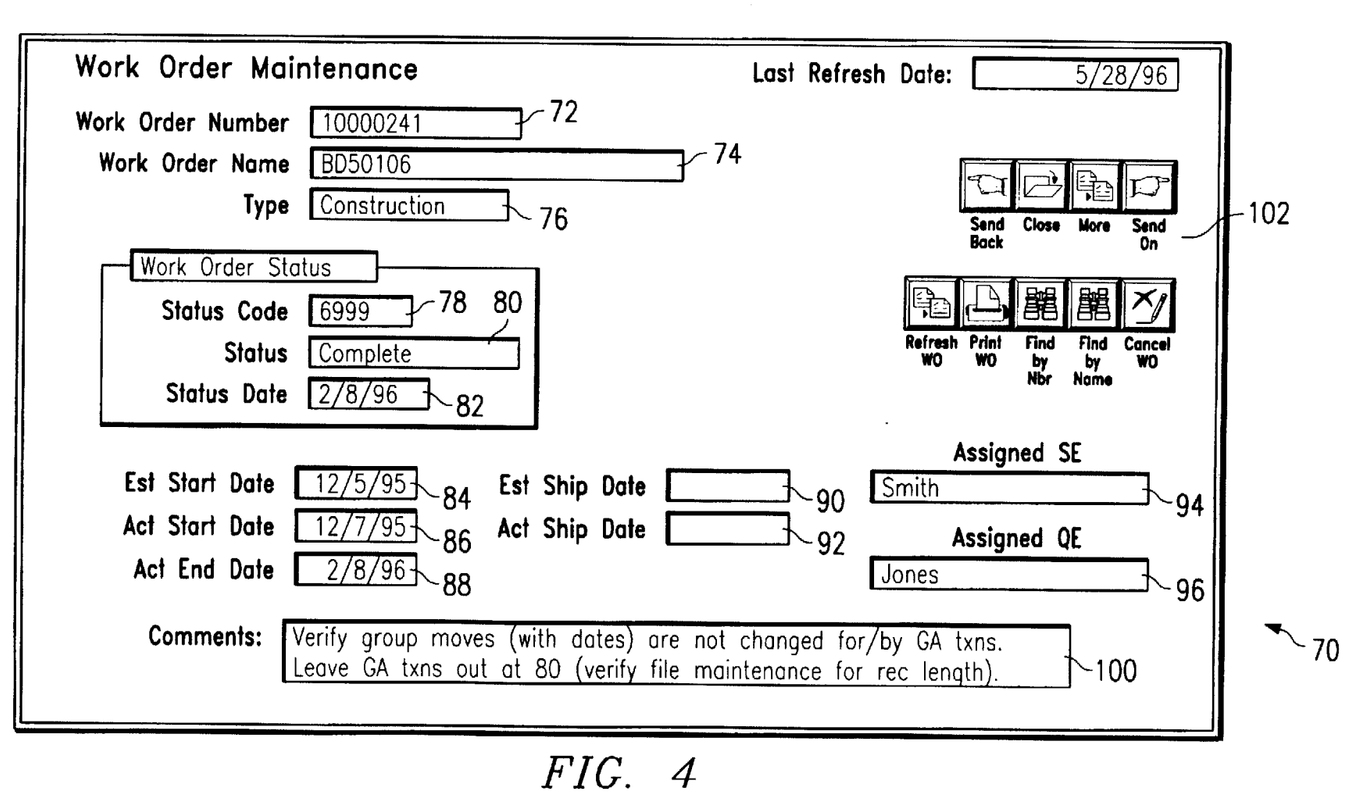
FIG. 4 illustrates an exemplary work order screen generated by the system shown in FIG. 2.

FIG. 4 illustrates an exemplary work order screen 70 generated by system 30 shown in FIG. 2. Work order screen 70, which may be a graphical user interface (GUI), can be used to input, view, or modify information relating to a particular work order 28. Work order screen 70 may include a number of input or view items. Each of these view items may be used for viewing, inputting, selecting, modifying, or expanding information. At least a portion of these input or view items can be implemented as pull-down menus which present a user with a selection list for inputting information. The pull-down menus can be driven from information stored in inventory memory 36, and work order memory 46. Other input or view items may require that information be input by keying or typing. Still other items can be configured to default to a predetermined default. Other fields can be managed by system 30.

A work order number field 72 can be used to display or input a work order number associated with a particular work order 28. A user of system 30, such as, for example, a project leader, can input the number by typing, or system 30 can automatically create the number as the work order 28 is configured. Once other information relating to the work order has been entered into system 30, work order number field 72 can function as a pull-down menu to present a list of work order numbers from which a user can select to modify or view the information corresponding to a particular work order number. A work order name field 74 can be used to input or view a name given to the work order 28 identified by the work order number specified in field 72. Like work order number field 72, work order name field 74 may also function as a pull-down box for selecting a particular work order 28. A type field 76 can be used to input or view the type of the work order. These types may include analysis, construction, testing, shipping, or any other suitable type of work which can be performed on a program 12. When entering a type, type field 76 may function as a pull-down box which lists all of the various types for work orders 28.

A status code field 78 can be used to display or view a status code for the work order 28. These codes may be alpha-numeric codes. Status code field 78 may function as a pull-down box which displays a list of all status codes available for a work order. In one embodiment, as action is taken pursuant to do the work order 28, any of a project leader, a system engineer, a quality assurance engineer, or any other appropriate user can update the status code of the work order 28. Alternatively, system 30 may automatically update the status code displayed in field 78 when a user takes other action, such as, for example, accepting or rejecting the work order 28. A status field 80 can be used to input or view a general description of the status of the work order 28. Status field 80 can be a pull-down menu which displays a list of all possible status descriptions. A status date field 82 may be used to input or view the date on which the status was last updated. In one embodiment, status date field 82 may be configured so that the current date is automatically input whenever the status code or status is updated.

An estimated start date field 84 can be used to input or view the estimated date on which work pursuant to the work order 28 will start. An actual start date field 86 and an actual end date field 88 may be used to input or view the actual dates on which work is begun and completed, respectively. An estimated shipment date field 90 and an actual shipment date field 92 can be used to input or view an estimated date or an actual date, respectively, on which the computing application should be operational and ready for delivery or production. It should be understood that the number and type of date fields preferably can be customized for each application. For example, additional date fields may be included in other embodiments to convey or receive other dates as desired or necessary.

An assigned system engineer field 94 can be used to input or view the name or identity of a system engineer assigned to perform work pursuant to the work order 28. An assigned quality assurance engineer field 96 can be used to input or view the name or identity of the quality assurance engineer assigned to check the work performed pursuant to the work order 28. Like the date fields described above, the number and type of personnel fields preferably can be customized. Thus, for example, alternate embodiments may include other personnel fields in addition to, or instead of, fields 94 and 96.

A comment field 100 can be used to input or view a descriptive comment for the work order 28. As action is taken pursuant to the work order 28, any appropriate user, such as the project leader, the system engineer, or the quality assurance engineer, may update or change the information appearing in comment field 100 to notify or inform the next user of particular details relating to the work order 28. In one embodiment, system 30 can automatically generate a comment for comment field 100 which specifies all other work orders 28 relating to the same program 12. Consequently, one user preferably cannot undo another user's work by saving over that user's changes.

A details section 102 may include one or more "buttons" for providing additional detail regarding the work order 28. This detailed information includes the inventory information 11 associated with the work order 28. In particular, the detailed information specifies the programs 12, subsystems 14, copybooks 16, tag names 18, maps 20, reports 22, files 24, and sorts 26 related to the work order 28. Any or all of this information can be input or viewed from various pull-down menus. Because of the relationships established by data structure 10 shown in FIG. 1, the information appearing in any particular pull-down menu may be determined by the information entered into another pull-down menu. For example, if a particular program 12 is specified in one pull-down menu, only those subsystems 14, copybooks 16, tag names 18, maps 20, reports 22, files 24, and sorts 26 associated with that program 12 will be specified in other pull-down menus.

Figure 5:
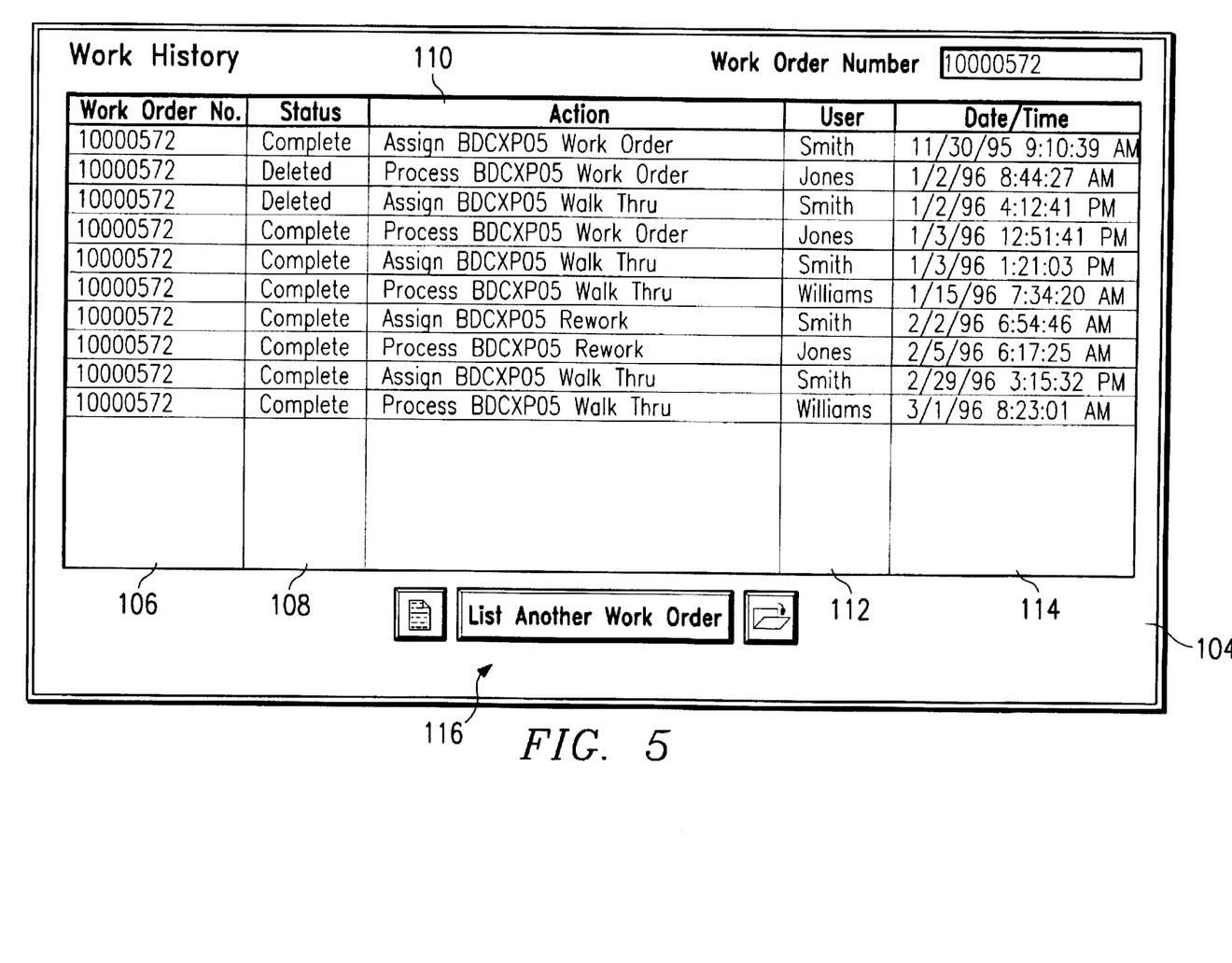
FIG. 5 illustrates an exemplary work history screen generated by the system shown in FIG. 2.

FIG. 5 illustrates an exemplary work history screen 104 that may be generated by system 30 shown in FIG. 2. Work history screen 104 may correspond to a particular work history 45. As illustrated, work history screen 104 can be specific to a particular work order 28. Work history screen 104 essentially tracks various actions taken with respect to the work order 28, such as assigning the work order, rejecting the work order, accepting the work order, reassigning the work order, processing the work order, or closing the work order. Work history screen 104 comprises a plurality of columns containing information relating to the specific work order 28. It should be understood, however, that in other embodiments, a work order screen may contain information relating to multiple work orders 28. These columns include work order number column 106, status column 108, assignment column 110, user column 112, and time and date column 114.

Work order number column 106 specifies one or more work orders 28 by number, name, or description. Status column 108 specifies the status of the work order 28 according to a particular action taken by a user. Each status specified in column 108 is preferably either "complete" or "delete." "Complete" indicates that the user has performed or has agreed to perform the action. "Delete" indicates that the user has refused the action. These actions may be specified in an action column 110. For example, one action may be an "assign," whereby a project leader assigns a work order 28 to a system engineer or a quality assurance engineer. Another action may a "process," whereby a system engineer or a quality assurance engineer performs work pursuant to the work order 28. A user column 112 identifies the user of system 30 who performs or has agreed to perform the action identified in action column 110. Date and time column 114 specifies the date and time on which action was performed.

Work history screen 104 also includes a plurality of buttons 116 for displaying additional work histories 45 or more detailed information.

Figure 6:
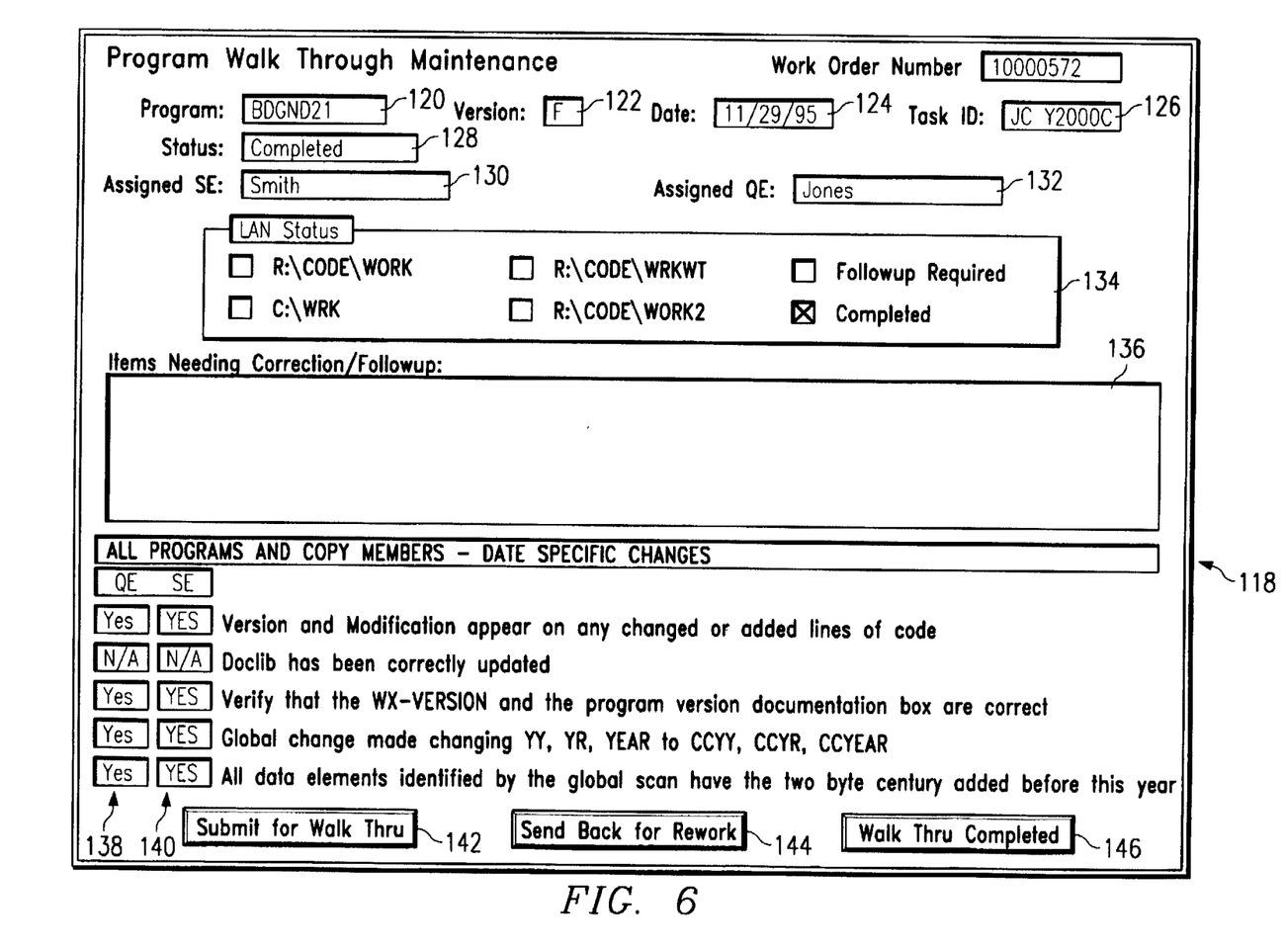
FIG. 6 illustrates an exemplary checklist screen generated by the system shown in FIG. 2.

FIG. 6 illustrates an exemplary checklist screen 118 corresponding to a particular checklist 44. Checklist screen 118 can be generated by system 30 and may be work order specific. Checklist screen 118, which may be a graphical user interface, can be used to input, view, or modify information relating to a particular checklist 44. In particular, checklist screen 118 can be used to check work performed pursuant to the work order 28. Screen 118 may include a plurality of input or viewing items for viewing, inputting, selecting, or modifying information. At least a portion of the input or viewing items may be implemented as pull-down menus which present a user with a selection list for inputting information. The pull-down menus can be driven by inventory information 11, work orders 28, checklists 44, and other information stored in the memories of system 30.

A program field 120 can be used to view or input a program 12 on which work is performed pursuant to the work order 28. In one embodiment, program field 120 can be a pull-down menu which displays a list of all programs 12 in the computing application. A version field 122 can be used to view or input the version of the program 12 specified in program field 120. A date field 124 can be used to view or input the date on which the checklist 44 corresponding to screen 118 is used by a system engineer or quality assurance engineer to check work performed pursuant to the work order 28. In one embodiment, system 30 may automatically default to the current date when checklist screen 118 is used. A task ID field 126 can be used to input or view the project to which the checklist belongs. A status field 128 can be used to input or view the status of the action relating to the work order 28.

An assigned system engineer field 130 can be used to input or view the name or identity of a system engineer assigned to perform work pursuant to the work order 28. An assigned quality assurance engineer field 132 can be used to view or input the name or identity of the quality assurance engineer assigned to perform quality assurance on the work order after work has been performed. Both the assigned system engineer and the assigned quality assurance engineer may complete a portion of the checklist 44 shown in checklist screen 118. A LAN status field 134 can be used to input or view an identifier for the physical location of a program. A comment field 136 can be used to view or input commentary information relating to the work order 28.

Checklist screen 118 also preferably comprises a plurality of check fields 138 and 140, each of which specifies some task that should be or was performed pursuant to the work order 28. Each check field 138 is completed by the system engineer assigned to work on the work order 28. Each check field 138 has an associated or corresponding check field 140, which may be completed by the quality assurance engineer assigned to check the work performed by the system engineer.

Checklist screen 118 also includes a plurality of icons 142, 144, and 146 which are activated by either a system engineer or quality assurance engineer after completing the entries 138 or 140, respectively, on checklist screen 118. In particular, a submit walk-through icon 142 can be activated by a system engineer after completing entries 138 so that the work order 28 may be submitted for a quality assurance check to be performed by a quality assurance engineer. A send back for rework icon 144 can be activated by a quality assurance engineer if additional work pursuant to work order 28 needs to be performed. A walk-through completed icon 146 can be activated when all work is finished on the work order 28.

Although screens 70, 104, and 118 in FIGS. 4, 5, and 6, respectively, have been illustrated and described as WINDOWS™-type display screens, it should be understood that in other embodiments the screens generated by system 30 can be displayed in one or more alternate formats.

Figure 7:
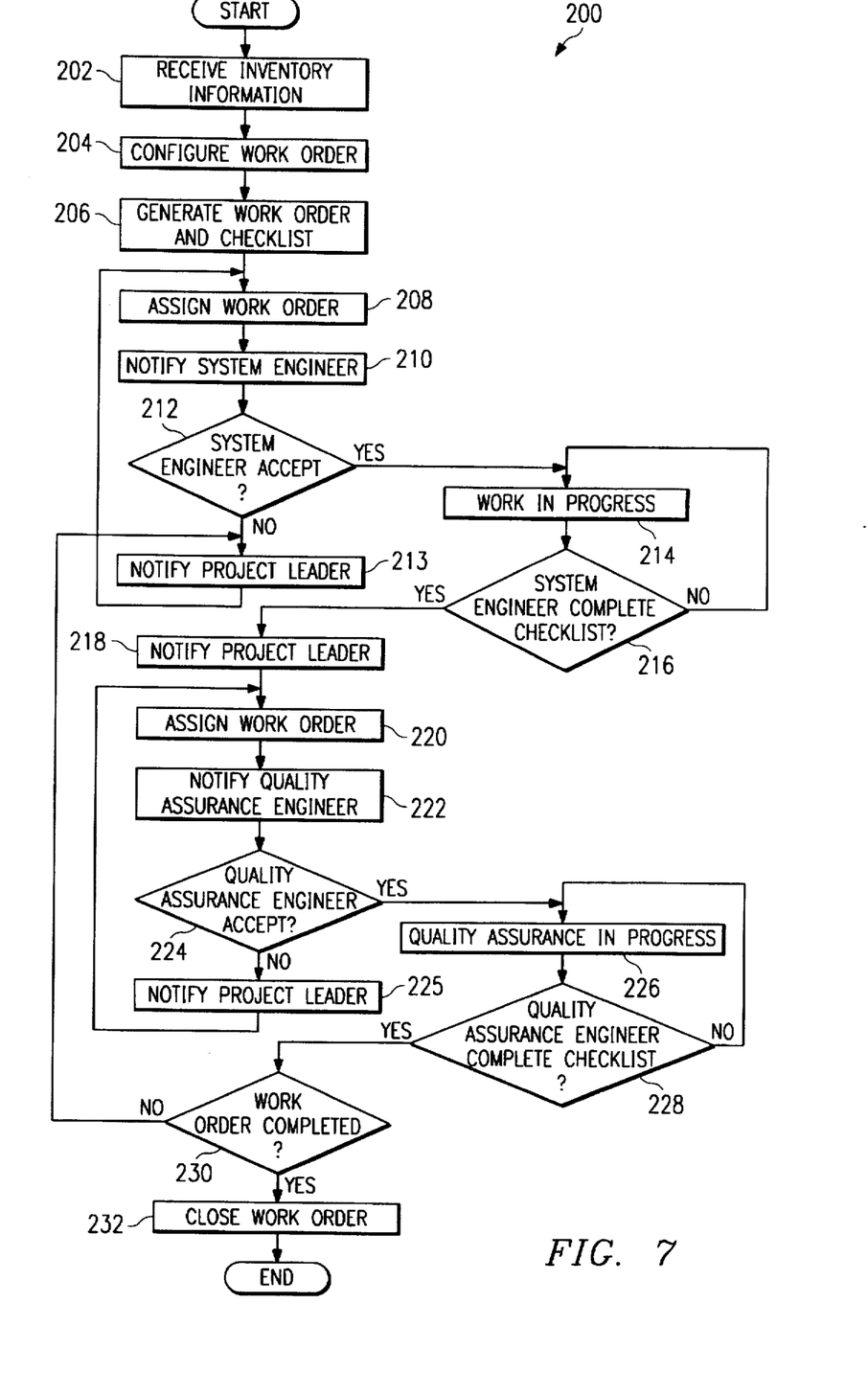
FIG. 7 is a flow chart of an automated method for managing work in a computing application, according to an embodiment of the present invention.

FIG. 7 is a flow chart of an automated method 200 for managing work in a computing application. Method 200 begins at step 202 where system 30, via first interface 32, receives and stores inventory information 11 relating to one or more programs 12 and their associated subsystems 14, copybooks 16, tag names 18, maps 20, reports 22, files 24, and sorts 26. This inventory information 11 can be stored in inventory memory 36. A project leader can configure a work order 28, for example, using second interface 38, at step 204. The configuration of a work order 28 can be driven by inventory information 11 stored in memory 36. At step 206, router 40 generates a work order 28 and a corresponding checklist 44 in response to the configuration and inventory information 11.

A project leader, using second interface 38, may then assign the work order 28 to an appropriate system engineer at step 208. At step 210, system 30 notifies the assigned system engineer of the work order 28, for example, by displaying the work order 28 to the system engineer at one of interfaces 50–54.

At step 212, system 30 determines whether the assigned system engineer accepts the work order 28. If not, system 30 notifies the project leader at step 213 and then returns to step 208 where the project leader assigns the work order 28 to another system engineer. System 30 repeats steps 208–213 until a system engineer has accepted the work order 28.

After the work order 28 has been accepted, at step 214 system 30 acknowledges that work is in progress if queried about a status of the work order 28. At step 216, system 30 determines whether the system engineer has completed a first portion of the checklist 44 corresponding to the work order 28. If not, system 30 returns to step 214 where it acknowledges that work is in progress if queried about the status of the work order 28. System 30 repeats steps 214 and 216 until the system engineer completes the first portion of the checklist 44. When the system engineer completes the first portion of the checklist 44, system 30 notifies a project leader at step 218.

At step 220, the project leader assigns the work order 28 to a quality assurance engineer for review of the work performed by the system engineer. System 30 then notifies the quality assurance engineer at step 222, for example, by displaying the work order 28 at one of interfaces 50–54.

At step 224, system 30 determines whether the assigned quality assurance engineer accepts the work order 28. If not, system 30 notifies the project leader at step 225 and then returns to step 220 where the project leader may assign the work order 28 to another quality assurance engineer. System 30 repeats steps 220–225 until a quality assurance engineer has accepted the work order 28.

At step 226, system 30 acknowledges that quality assurance is in progress if queried about a status of the work order 28. At step 228, system 30 determines whether the quality assurance engineer has completed a second portion of the checklist 44 corresponding to the work order 28. If not, system 30 returns to step 226 where it acknowledges that quality assurance is in progress is queried about the status of work order 28. System 30 repeats steps 226 and 228 until the quality assurance engineer completes the second portion of checklist 44.

When the second portion of checklist 44 has been completed, then at step 230, system 30 determines whether the work order has been completed. If not, system 30 returns to step 213 where it notifies the project leader who then assigns the work order 28 to an appropriate system engineer at step 208. The system engineer can then perform additional work pursuant to the work order 28 to complete or correct the previous work.

System 30 repeats steps 208–230 until all work pursuant to the work order 28 has been completed. At step 232, system 30 closes the work order 28.

Although the present invention and its advantages have been described in detail, it should be understood that various changes, substitutions, and alterations can be made therein without departing from the spirit and scope of the invention as defined by the appended claims.

What is claimed is:

1. An automated system for managing work in connection with computer applications programming, comprising:

an interface for receiving inventory information pertaining to said computer applications programming and for receiving a work order configuration that identifies a specified program of said applications programming;

an inventory memory coupled to the interface, said inventory memory operable to store the inventory information, said inventory information representing programs that constitute said applications programming and representing data pertaining to said programs;

a program memory, in data communication with said interface, which stores said programs that constitute said applications programming;

a routing processor coupled to said inventory memory, to said interface, and to said program memory, said routing processor having stored work management programming that generates a work order in response to the work order configuration, the work order specifying at least a portion of the inventory information, that tracks the work order as actions are taken pursuant to the work order, that receives data identifying said specified program, and that links said work order to said specified program.

2. The system of claim 1, wherein said work management programming further generates a work history specifying details for actions taken pursuant to the work order.

3. The system of claim 1, wherein said work management programming further generates a checklist corresponding to the work order.

4. The system of claim 3, wherein said work management programming further determines when a portion of the corresponding checklist has been completed.

5. The system of claim 1, wherein said work management programming further determines when an action relating to the work order has been completed and updates a work history for the work order in response to the determination.

6. The system of claim 1, wherein the interface is further displays the generated work order.

7. The system of claim 1, wherein said work management programming further determines whether the generated work order has been accepted.

8. The system of claim 7, wherein said work management programing further generates notification about the acceptance of the work order.

9. The system of claim 1, wherein said work management programming further downloads a program specified by the work order.

10. The system of claim 1, wherein said work management programming further provides a status of the work order.

11. A method performed by a computer for managing work in connection with computer applications programming, comprising the steps of:

receiving inventory information pertaining to said applications programming and describing a number of programs that constitute said applications programming;

receiving a work order configuration that identifies at least one specified program of said programs that constitute said applications programming;

generating a work order in response to the work order configuration, the work order specifying at least a portion of the inventory information;

linking said work order to said specified program;

tracking the work order as actions are taken pursuant to the work order; and storing said specified program in a form resulting from actions pursuant to said work order.

12. The method of claim 11, further comprising the step of generating a work history specifying details for actions taken pursuant to the work order.

13. The method of claim 11, further comprising the step of generating a checklist corresponding to the work order.

14. The method of claim 11, further comprising the step of generating notification when work pursuant to the work order has been completed.

15. The method of claim 11, further comprising the step of generating a prompt to accept or reject the work order.

16. The method of claim 11, further comprising the step of downloading a program specified by the work order.

17. The method of claim 11, further comprising the step of providing a graphical interface object on said work order for accessing said inventory information pertaining to said specified program.

18. The method of claim 17, wherein said graphical interface object is a button.

19. The method of claim 17, further comprising the step of providing a menu listing said specified program, in response to activation of said graphical interface object.

20. The method of claim 11, further comprising the step of providing a graphical interface object on said work order for routing said work order to a specified location.

* * * * *